United States Patent
Kumar et al.

(10) Patent No.: US 11,295,076 B1
(45) Date of Patent: Apr. 5, 2022

(54) SYSTEM AND METHOD OF GENERATING DELTAS BETWEEN DOCUMENTS

(71) Applicant: Intuit Inc., Mountain View, CA (US)

(72) Inventors: Mritunjay Kumar, Bangalore (IN); Saikat Mukherjee, Mountain View, CA (US); Karpaga Ganesh Patchirajan, Plano, TX (US); Anu Singh, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/527,360

(22) Filed: Jul. 31, 2019

(51) Int. Cl.
*G06F 40/194* (2020.01)
*G06Q 40/00* (2012.01)
*G06F 40/289* (2020.01)

(52) U.S. Cl.
CPC .......... *G06F 40/194* (2020.01); *G06F 40/289* (2020.01); *G06Q 40/123* (2013.12)

(58) Field of Classification Search
CPC ...... G06F 40/10; G06F 40/194; G06F 40/197; G06F 40/205; G06F 40/279; G06F 40/284; G06F 40/289; G06F 40/123
See application file for complete search history.

(56) References Cited

U.S. PATENT DOCUMENTS

| | | | | |
|---|---|---|---|---|
| 7,702,683 B1* | 4/2010 | Kirshenbaum | ....... | G06F 16/152 707/758 |
| 9,159,319 B1* | 10/2015 | Hoffmeister | ............ | G10L 15/08 |
| 2004/0261009 A1* | 12/2004 | Torigoe | ................ | G06F 16/958 715/255 |
| 2008/0162455 A1* | 7/2008 | Daga | ..................... | G06F 16/313 |
| 2014/0101526 A1* | 4/2014 | Marsh | ................... | G06F 40/194 715/229 |
| 2015/0269146 A1* | 9/2015 | Ayyar | ................. | G06Q 10/101 707/608 |
| 2016/0065597 A1* | 3/2016 | Nguyen | ............. | H04L 63/1408 726/22 |
| 2016/0350395 A1* | 12/2016 | Gupta | ................... | G06F 40/289 |
| 2018/0082183 A1* | 3/2018 | Hertz | ....................... | G06F 16/36 |
| 2018/0089155 A1* | 3/2018 | Baron | ................... | G06F 40/194 |
| 2018/0203844 A1* | 7/2018 | Greer | .................... | G06F 40/194 |
| 2020/0104359 A1* | 4/2020 | Patel | .................... | G06N 3/0472 |

* cited by examiner

*Primary Examiner* — Chau T Nguyen
(74) *Attorney, Agent, or Firm* — DLA Piper LLP (US)

(57) ABSTRACT

Generating a difference between a first and second plurality of lines of text in structured machine-readable format may include determining, by at least one processor, a line of the second plurality of lines that constitutes a best match for a line of the first plurality of lines. The line of the first plurality of lines and its respective best match may be associated with a similarity score. The at least one processor may compare the similarity score to a threshold value. In response to determining that the similarity score is greater than or equal to the threshold value, the at least one processor may compute, the textual difference between the line of the first plurality of lines and its best match. In response to computing the textual difference, the at least one processor may analyze the textual difference to identify a non-meaningful change. In response to identifying a non-meaningful change, the at least one processor may record the textual difference in a delta with a flag indicating the presence of the non-meaningful change.

18 Claims, 9 Drawing Sheets

```
{
"partNo": "1",
"modifiedLineConstants": [
  {
    "source": "desc",
    "type": "Money",
    "newValue": "83,800",
    "oldValue": "83,400"
  },
  {
    "source": "desc",
    "type": "Money",
    "newValue": "53,900",
    "oldValue": "53,600"
  },
  {
    "source": "desc",
    "type": "Money",
    "newValue": "41,900",
    "oldValue": "41,700"
  },
  {
    "source": "desc",
    "type": "Year",
    "newValue": "2016",
    "oldValue": "2015"
  },
  {
    "source": "desc",
    "type": "Money",
    "newValue": "23,900",
    "oldValue": "23,800"
  }
],
"newContent": "Enter: $83,800 if married filing jointly or qualifying widow(er) for 2016; $53,900 if single or head of household for 2016; or $41,900 if married filing separately for 2016. Estates and trusts, enter $23,900",
"lineNo": "5",
"oldContent": "Enter: $83,400 if married filing jointly or qualifying widow(er) for 2015; $53,600 if single or head of household for 2015; or $41,700 if married filing separately for 2015. Estates and trusts, enter $23,800"
}
```

FIG. 4

SYSTEM AND METHOD OF GENERATING DELTAS BETWEEN DOCUMENTS

BACKGROUND OF THE DISCLOSURE

Many companies and agencies, particularly in finance, tax, or government sectors, deal with compliance forms on a regular basis, such as tax documents and the like. Organizations will typically store these compliance forms in some sort of knowledge base, for example, a tax context knowledge base. However, forms change from year to year. Sometimes changes are trivial and sometimes they are substantive. For example, because of a new tax law, changes may be substantive and include things such as rewritten calculation methods for values like adjusted gross income or altered line dependencies. Trivial changes may involve the year changing on the form.

Updating the knowledge base to account for these year to year changes can be tremendously costly in terms of time, money, and resources. For income tax alone in the United States, there are more than 5,000 different forms. This number grows even greater when taking into account payroll taxes, gift taxes, etc.

Current methods of updating tax content knowledge bases are largely performed manually. These methods entail using PDF Comparer tools and a Draftable API to identify changes between documents or forms from consecutive years. Not only is this process slow, costly, and tedious, but it yields many false positives. Current tools compare forms and can detect visual changes, but not content changes.

BRIEF DESCRIPTION OF THE FIGURES

FIG. 2 shows an example comparison of two compliance forms using current techniques for document comparison.

FIG. 3 shows an additional example comparison of two compliance forms using current techniques for document comparison.

FIG. 4 shows an example delta generated to describe the changes between the compliance forms of FIG. 3, according to an embodiment of the present disclosure.

DETAILED DESCRIPTION OF SEVERAL EMBODIMENTS

Embodiments of the present disclosure relate to systems and methods of generating deltas between two documents. This method may be used to automatically update context knowledge bases with year to year changes of documents. If two forms are presented in machine readable format, the system may compare the two documents, analyze the changes, and output only the substantive changes. In some embodiments, these documents may be from consecutive years (e.g. a 2018 version of a tax form and a 2019 version of the same tax form). The system may automatically identify contextual changes, filter non-substantive changes (i.e. noise such as punctuation changes, simple tax year label changes, etc.), and provide the changes in a structured, machine readable format. The output of the system may reduce the time and effort required to update a knowledge base to reflect year to year changes by providing valuable insight to developers, increasing their productivity.

Figure 1:
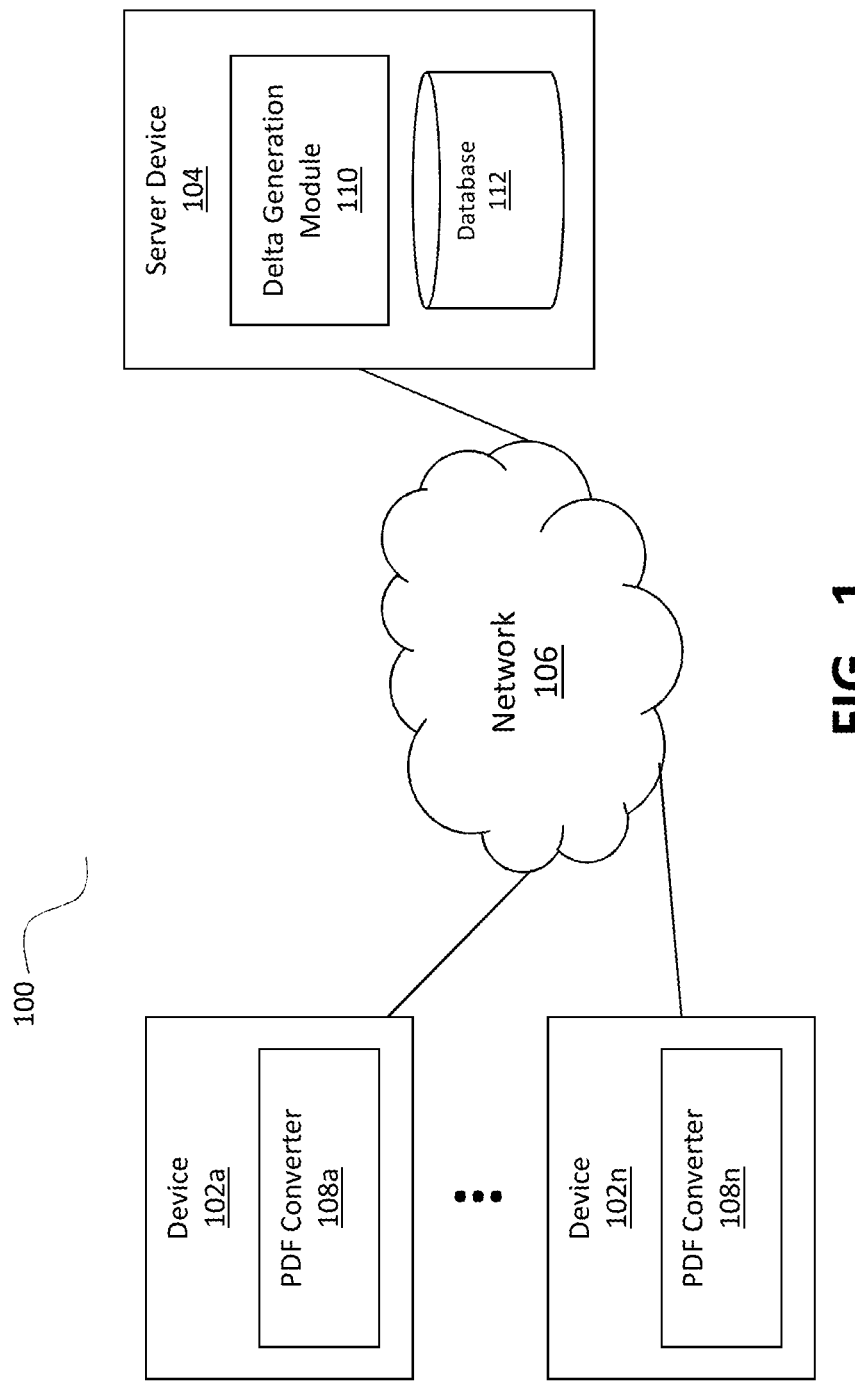
FIG. 1 shows an example system for generating a delta between two documents, according to an embodiment of the present disclosure.

FIG. 1 shows an example system 100 for generating a delta between two documents, according to an embodiment of the present disclosure. System 100 can include one or more devices 102*a*, . . . , 102*n* (102 generally) communicably coupled to server device 104 via network 106.

Server device 104 may include any combination of one or more of web servers, mainframe computers, general-purpose computers, personal computers, or other types of computing devices. Server device 104 may represent distributed servers that are remotely located and communicate over a communications network, or over a dedicated network such as a local area network (LAN). Server device 104 may also include one or more back-end servers for carrying out one or more aspects of the present disclosure. In some embodiments, server device 104 may be the same as or similar to device 900 described below in the context of FIG. 9.

As shown in FIG. 1, server device 104 may include delta generation module 110 and a database 112. In some embodiments, delta generation module 110 may be configured to receive documents from device 102 via network 106. In some embodiments, the documents may be in machine readable format. Delta generation module 110 may be configured to generate a delta between two documents in machine readable format. Delta generation module 110 may also be configured to return the generated delta to device 102 via network 106. In some embodiments, the generated delta may be a JSON object. The database 112 may be configured to store some or all of the documents received from device 102. In some embodiments, the database 112 may be a tax content knowledge database or other compliance form maintenance database. The various system components—such as module 110—may be implemented using hardware and/or software configured to perform and execute the processes, steps, or other functionality described in conjunction therewith.

Device 102 can include one or more computing devices capable of receiving user input as well as transmitting and/or receiving data via network 106 or communicating with server device 104. In some embodiments, user device 102 can include a conventional computer system, such as a desktop or laptop computer. Alternatively, user device 102 may include a device having computer functionality, such as a personal digital assistant (PDA), a mobile telephone, a smartphone, or other suitable device. As shown in FIG. 1, device 102 may include PDF Converter 108. PDF Converter 108 may be configured to convert documents in PDF, Word, etc. format into machine readable format. Device 102 may be configured to send documents via network 106 to server device 104.

Network 106 may include one or more wide area networks (WANs), metropolitan area networks (MANs), local area networks (LANs), personal area networks (PANs), or any combination of these networks. Network 106 may include a combination of one or more types of networks such as Internet, intranet, Ethernet, twisted-pair, coaxial cable, fiber optic, cellular, satellite, IEEE 8011.11, terrestrial, and/or other types of wired or wireless networks. Network 106 can also use standard communication technologies and/or protocols.

Figure 2:
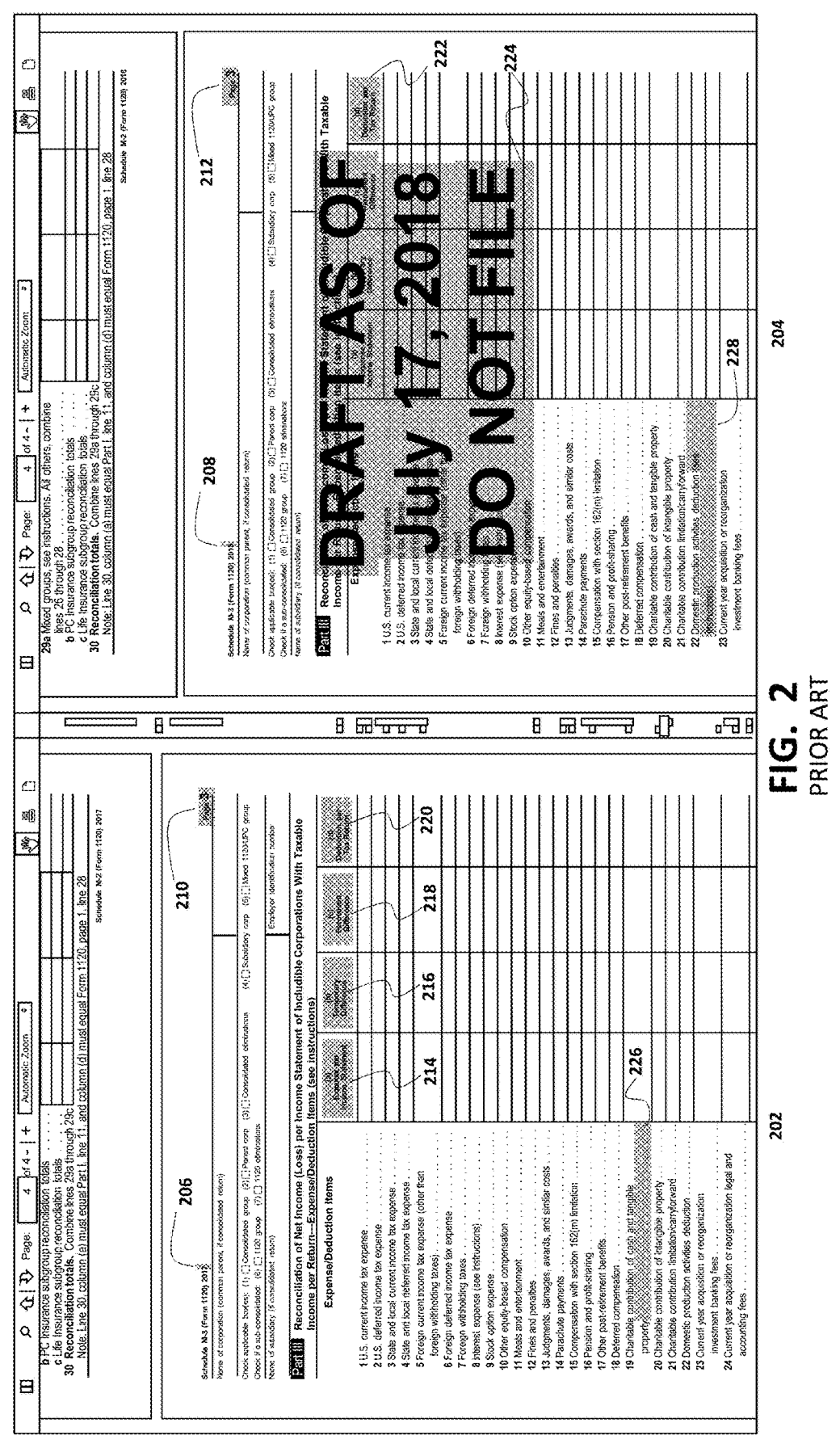

FIG. 2 shows an example comparison of two compliance forms using current techniques for document comparison. The two documents in FIG. 2 are example tax forms, document 202 is a 2017 Schedule M-3 Form 1120 and document 204 is a draft 2018 Schedule M-3 Form 1120. In many fields, before current year documents and compliance forms are finalized, they are distributed to companies that make use of them. However, because they are not finalized yet, documents often come with a "DRAFT" watermark, negatively impacting many document comparison techniques. Highlight 224 shows that the system identified the watermark as a change; this may be an example of a false positive. This change, the inclusion of a watermark, is to be expected between these forms and does not need to be included in the delta between these two forms.

Highlights 206 and 208 indicate that the system detected a tax year change from 2017 to 2018; this may be another example of a false positive, as this is an expected and non-substantive change. Highlights 210 and 212 indicate the system flagged some sort of change in the page number text. This may include spacing, or something else unaccounted for; regardless it is a false positive as, upon human examination, there is no substantive change.

Other false positives in FIG. 2 include highlights 214, 216, 218, 220, and 222, where the system detected a change in the amount of space in the respective boxes. Highlight 226 may also be a false positive; the system detected more spacing after "19. Charitable contribution of cash and tangible property" in form 202 than there is after "19. Charitable contribution of cash and tangible property" in form 204. A similar change may be detected at highlight 228, where the system detects the text "(see instructions)", which has been added to form 204.

Figure 3:
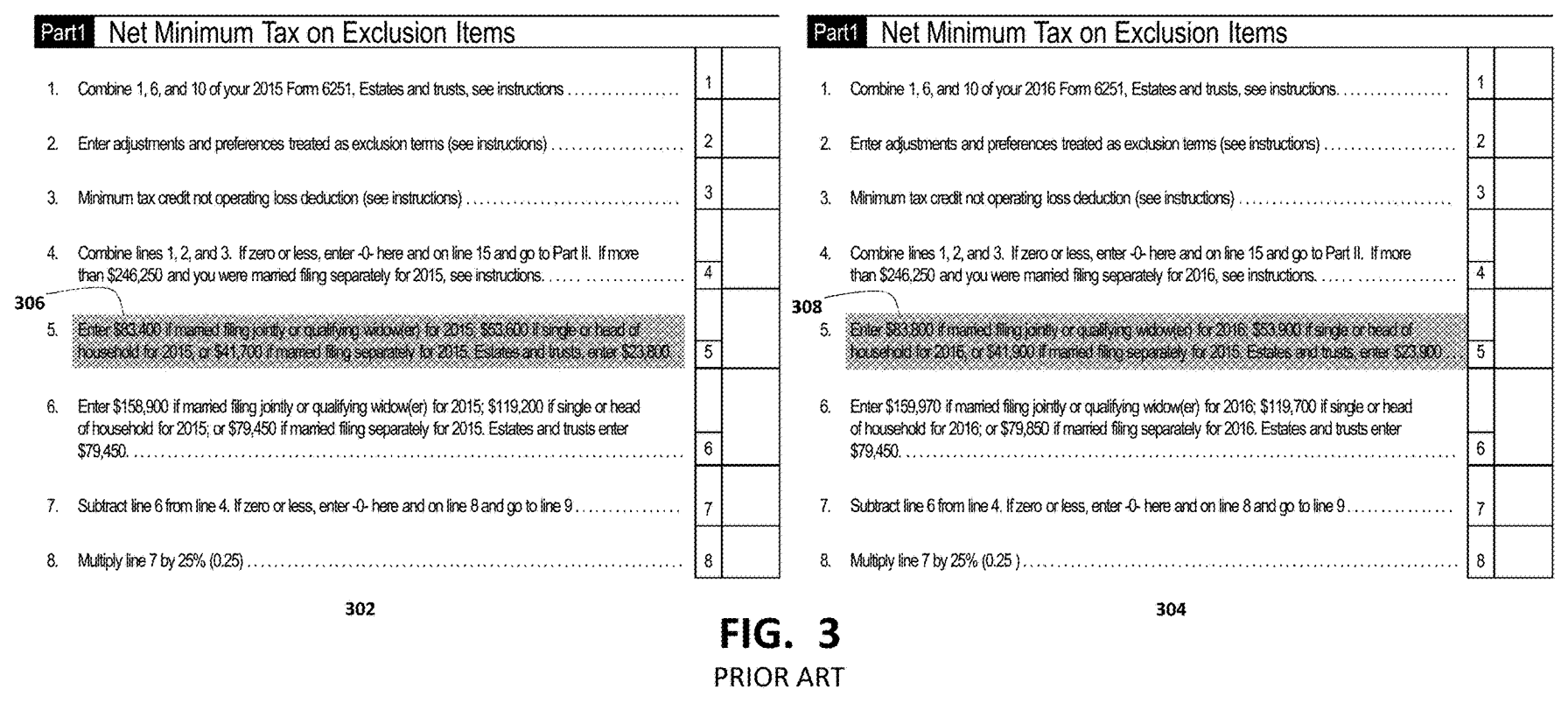

FIG. 3 shows an additional example comparison of two compliance forms, form 302 and form 304, using current techniques for document comparison. Highlights 306 and 308 indicate that the text of line 5 has changed between forms 302 and 304. When examined more closely, it can be seen that the changes are, in fact, substantive; however, there may be no seamless output of the change in such a way that contributes to easily updating a knowledge base with this information.

FIG. 4 shows an example delta generated to describe the changes between the compliance forms of FIG. 3, according to an embodiment of the present disclosure. The method of the present disclosure may detect substantive changes and output them in a manner that facilitates easy or automatic updating of a knowledge base. Referring back to FIG. 3, the substantive changes of line 5 across tax forms 302 and 304 include $83,400 changing to $83,800; $53,600 changing to $53,900; $41,700 changing to $41,900; and $23,800 changing to $23,900. The method of the present disclosure may capture these changes and output them in a manner according to FIG. 4, in machine readable format.

Figure 5:
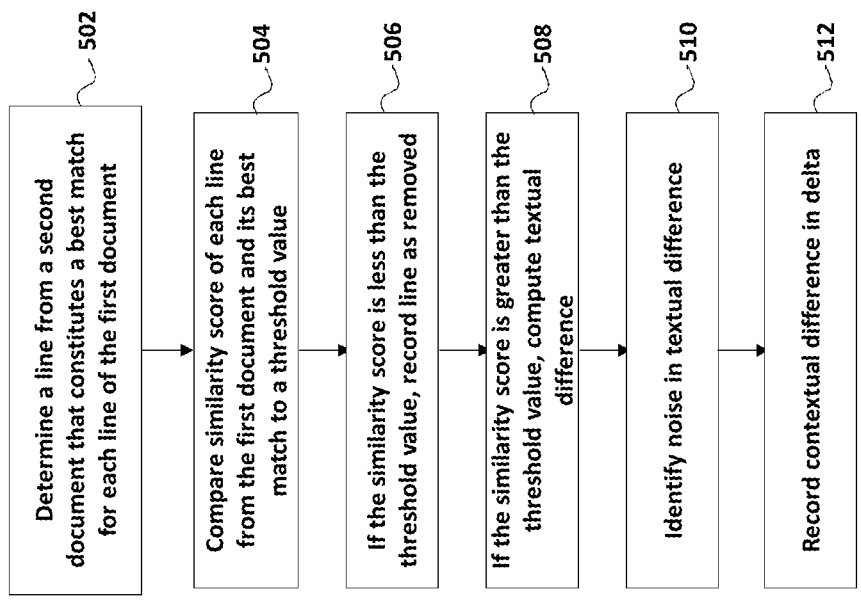
FIG. 5 is a flow diagram showing processing that may occur to generate a delta between two documents, according to an embodiment of the present disclosure.

FIG. 5 is a flow diagram showing process 500 that may occur to generate a delta between two documents, according to an embodiment of the present disclosure. In some embodiments, process 500 may be performed by server device 104 of system 100. The two documents may be in machine readable format. In some embodiments, the two documents may be consecutive year tax forms, where the first document may be a previous year form and the current document may be a current or draft current year form. At block 502, a best match may be determined for each line of the first document, meaning, for each line of the first document, a line from the second document may be determined to be the first line's best match. Further details of block 502 are discussed in relation to FIG. 6. In some embodiments, the line from the second document that constitutes a best match for the line from the first document may be the line which has the highest similarity score with the line of the first document. A similarity score may reflect the level of similarity between two textual lines. Methods for calculating a similarity score are discussed in relation to FIG. 7. In some embodiments, a similarity score may be between 0 and 1. To determine which line from a plurality of lines constitutes a best match to a separate line which is not part of the plurality of lines, a similarity score may be calculated between the separate line and each line of the plurality of lines. The line of the plurality of lines that yields the highest similarity score constitutes the line that best matches the separate line. This means that each line of the first document will have a similarity score and a corresponding line (its best match) from the second document associated with it.

At block 504, the similarity score between each line of the first document and its best match may be compared to a threshold value. In some embodiments, this threshold may be 0.5. At block 506, if the similarity score of a line of the first document may be determined to be less than the threshold value, the line may be recorded in a delta as a removed line (a line unique to the first document). As the similarity score may reflect the level of similarity between textual lines, it may be assumed that similarity scores below a certain threshold may constitute lines so dissimilar that, in the context of comparing consecutive versions of a document, the line of the first document corresponding to the similarity score has actually been removed from the next year document and the line of the second document that has been determined to be its best match may be likely to be a better match for another line from the first document.

At block 508, if the similarity score of a line of the first document is determined to be greater than the threshold value, the textual difference between the line of the first document and its best match may be computed. In some embodiments, this may be performed using the Myer's diff algorithm, which may determine the longest common subsequence and shortest edit script for transforming one sentence into another sentence. At block 510, the computed textual difference may be analyzed to identify noise (non-meaningful textual changes). A non-meaningful change may be a textual change of a line of text that does not change the meaning of the text. Similarly, a meaningful change may be a textual change of a line of text that does change the meaning of the text. In some embodiments, noise may be textual differences caused by changes in punctuation, spacing, symbols, or any other non-substantive change between lines. Examples of non-substantive changes are shown in Table 1, although this table is not exhaustive. Examples include missed punctuation, where a period has not been inserted at the end of the phrase; rephrasing, where "do not" is changed to the contraction "don't"; spacing, where an extra space has been added; case difference, where a letter may change from lowercase to uppercase; and tax year change. Step 510 may be performed automatically by a processor, where noise may be determined algorithmically or by a variety of techniques for recognizing patterns of text of characters. In some embodiments, step 510 may be performed by delta generation module 110. In some embodiments, if textual differences the same as or similar to the examples in Table 1 are detected, the textual difference may be flagged, where the flag identifies the textual difference as noise/non-meaningful change/etc. This flag may be stored in the generated delta.

TABLE 1

| Type of Textual Change | Original Line | Changed Line |
| --- | --- | --- |
| Missed Punctuation | For Tax year 2018. | For Tax year 2018 |
| Rephrasing | Do not include 2017 return data | Don't include 2017 return data |
| Spacing | Amount you owe | Amount you owe |
| Case Difference | This is the amount you Overpaid | This is the amount you overpaid |
| Tax Year Change | Include adjusted gross income from 2017 | Include adjusted gross income from 2018 |

At block 512, the contextual differences of each line of the first document may be recorded in a delta. The delta may reflect all changes between the first and second documents, and may have changes that have been identified as noise labeled as such. In some embodiments, the delta may be in machine readable format. In some embodiments, the delta may be a JSON object. The delta may be used to automatically update a knowledge base of forms.

In some embodiments, extra steps may be added to process 500 that may help to identify lines that are unique to the second form, similar to blocks 502-506 but applied in regard to the second document. A line from the first document that best matches each line of the second document may be determined, via the same methods as mentioned while discussing block 502. The similarity score of each line of the second document may be compared to the threshold value, and if the similarity score is less than the threshold value, the line of the second document may be recorded as an added line (unique to the second document).

Figure 6:
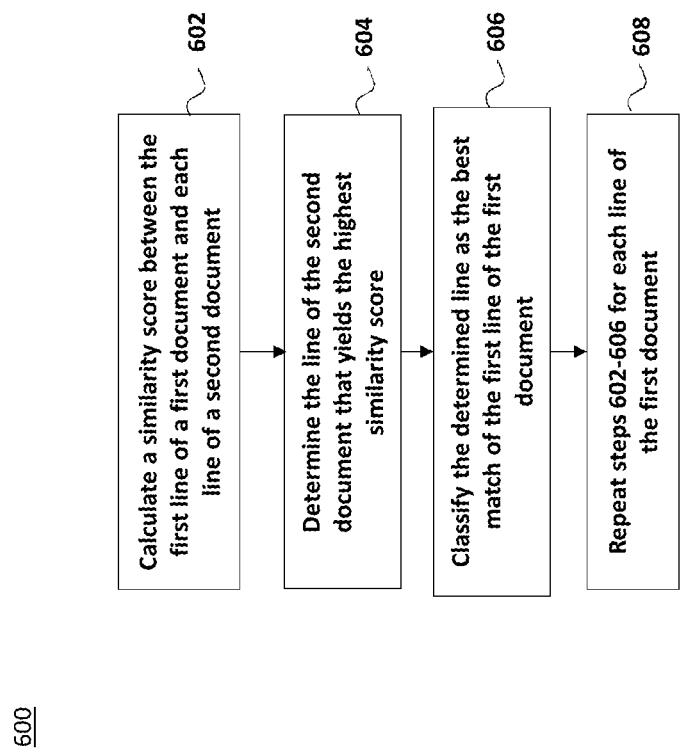
FIG. 6 is a flow diagram showing processing that may occur to determine best matching lines, according to an embodiment of the present disclosure.

FIG. 6 is a flow diagram showing process 600 that may occur to determine best matching lines, according to an embodiment of the present disclosure given two documents that may be in machine-structured format. In some embodiments, process 600 may be performed by server device 104 of system 100. At block 602, a similarity score may be calculated between the first line of a first document and each line of the second document. A similarity score may reflect the level of similarity between two textual lines. Methods for calculating a similarity score are discussed in relation to FIG. 7. For example, if the second document has 25 lines of text, 25 similarity scores may be calculated for the first line of the first document, representing the similarity of the first line of the first document with each line of the second document. At block 604, the line of the second document that yields the highest similarity score may be determined. At block 606, the line of the second document that yields the highest similarity score may be classified as the line that best matches the first line of the first document. At block 608, blocks 602-606 may be repeated for each remaining line of the first document. In some embodiments, there may be more lines in the first document or a similar number of lines in the first document as there are in the second document. Note that this process may be performed with additional or different steps, or may be performed in a different order. For example, the best match for each line of the first document does not need to be performed sequentially; parallel computation may be employed.

Figure 7:
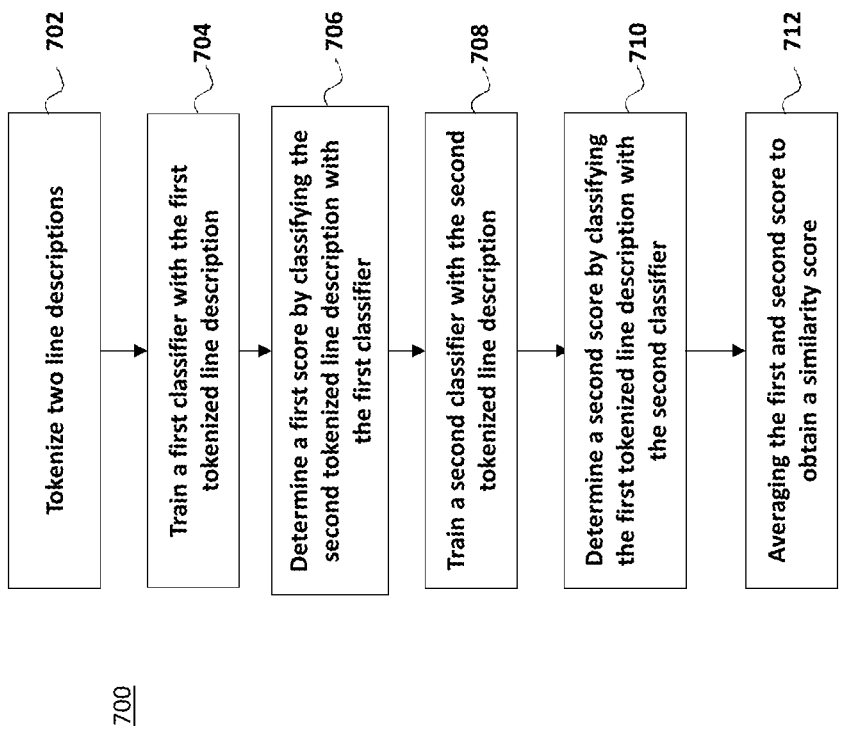
FIG. 7 is a flow diagram showing processing that may occur to calculate a similarity score, according to an embodiment of the present disclosure.

FIG. 7 is a flow diagram showing process 700 that may occur to calculate a similarity score between two entries of text, according to an embodiment of the present disclosure.

In some embodiments, process 700 may be performed by server device 104 of system 100. An entry of text is herein described as a line description. At block 702, each of the two line descriptions may be tokenized, or split into individual "words". In some embodiments, the splits may be performed according to various conditions, including space between words, symbols, numbers, or a combination of conditions. For example, tokenizing the phrase "total tax. Add lines 13 and 14" according to spaces would yield the following tokens: [total, tax., Add, lines, 13, and, 14]. At block 704, a first classifier may be trained with the first tokenized line description. In some embodiments, the classifier may be an instance of VectorClassifier and may be trained by an instance of TrainVectorClassifier. TrainVectorClassifier is an application that may train a classifier based on a labeled input (a tokenized line description) and a pre-determined list of features (tokens from the line description) and generates a model file that may characterize the classifier model. VectorClassifier is an application that may perform a vector classification based on the model file or the classifier model. In some embodiments, the classifiers may employ a variety of machine learning libraries for classification. At block 706, the second tokenized line description may be classified with the first classifier to determine a first score. In some embodiments, this step may classify the second tokenized line description in terms of the tokens of the first tokenized line description. At block 708, a second classifier is trained using the second tokenized line description. In some embodiments, this classifier may be an instance of VectorClassifier. In some embodiments, this step may classify the first tokenized line description in terms of the tokens of the second tokenized line description. At block 710, the first tokenized line description may be classified with the second classifier to determine a second score. At block 712, the first and second score may be averaged to determine the similarity score. Note that this process may be performed with additional or different steps, or may be performed in a different order. For example, steps 708-710 may happen either before or after steps 704-706, or all 4 steps may be performed simultaneously.

Figure 8:
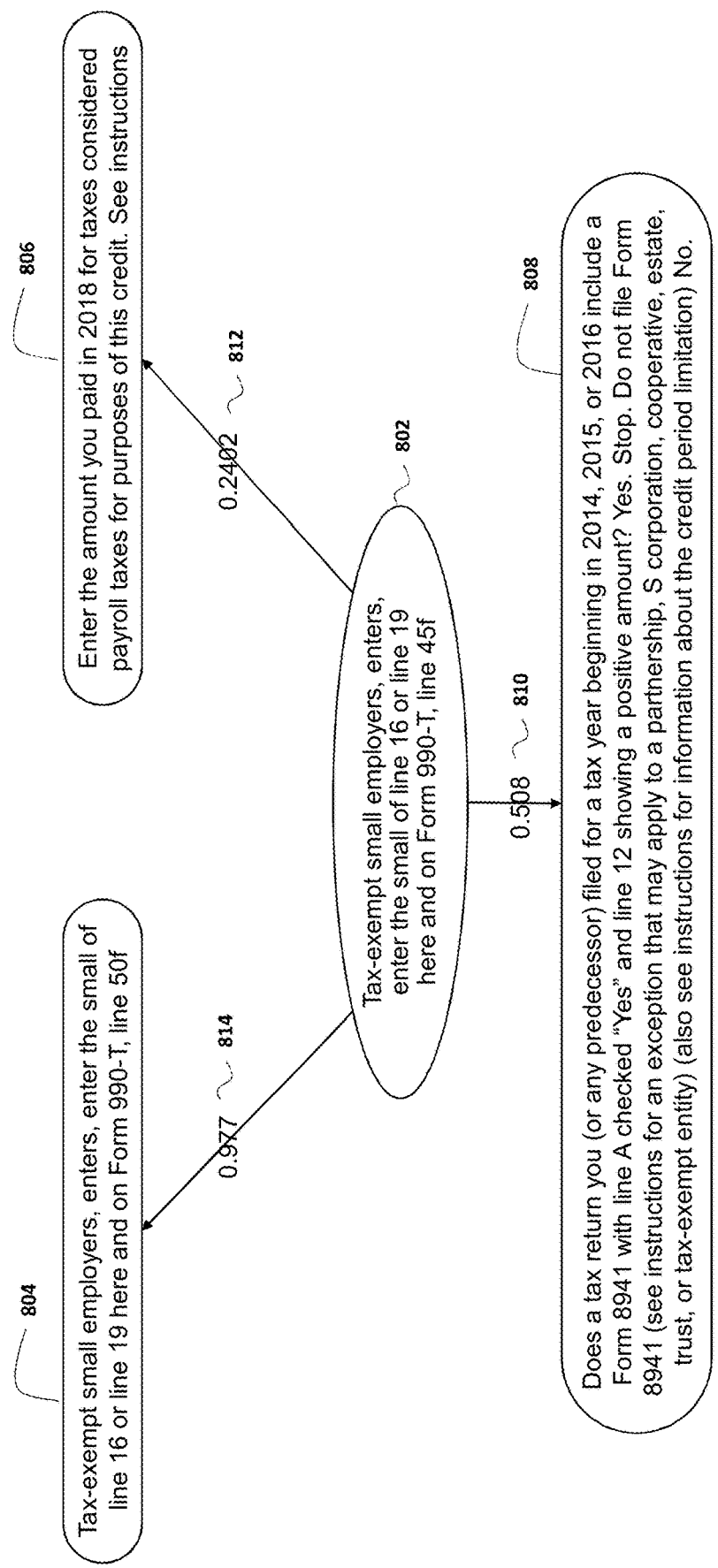
FIG. 8 shows example similarity score calculations, according to an embodiment of the present disclosure.

FIG. 8 shows example similarity score calculations, according to an embodiment of the present disclosure. In some embodiments, these calculations may be performed by server device 104 of system 100. A plurality of entries of text (804, 806, and 808) may be compared with a reference entry of text 802. The similarity score 814, which may be calculated according to the process 700, between line 802 and line 804 is 0.977, reflecting the high level of similarity between lines 802 and 804. Similarity score 810, which reflects the level of similarity between line 802 and line 808 is 0.508, indicating a lower level of similarity between the texts. Similarity score 812, which reflects the level of similarity between line 802 and 806, is 0.2402, indicating these two lines are the least similar of the groupings. In reference to process 500 and 600, line 804 may be selected as the best match for line 802.

Figure 9:
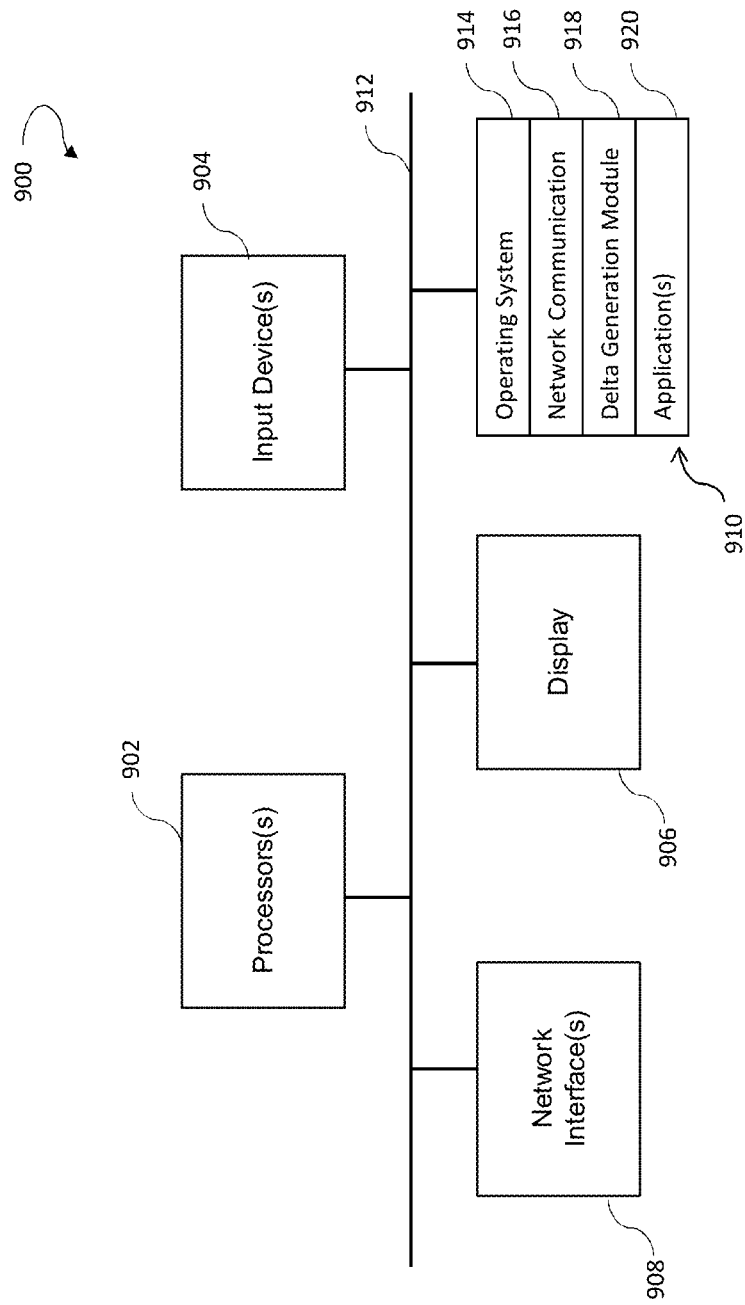
FIG. 9 shows an example server device, according to an embodiment of the present disclosure.

FIG. 9 shows an example server device, according to an embodiment of the present disclosure. For example, computing device 900 may perform the functions related to automatic detection of specific data such as sensitive information in clear text described above. The computing device 900 may be implemented on any electronic device that runs software applications derived from compiled instructions, including without limitation personal computers, servers, smart phones, media players, electronic tablets, game consoles, email devices, etc. In some implementations, the computing device 900 may include one or more processors 902, one or more input devices 904, one or more display devices 906, one or more network interfaces 908, and one or more computer-readable mediums 910. Each of these components may be coupled by bus 912, and in some embodiments, these components may be distributed among multiple physical locations and coupled by a network.

Display device 906 may be any known display technology, including but not limited to display devices using Liquid Crystal Display (LCD) or Light Emitting Diode (LED) technology. Processor(s) 902 may use any known processor technology, including but not limited to graphics processors and multi-core processors. Input device 904 may be any known input device technology, including but not limited to a keyboard (including a virtual keyboard), mouse, track ball, and touch-sensitive pad or display. Bus 912 may be any known internal or external bus technology, including but not limited to ISA, EISA, PCI, PCI Express, NuBus, USB, Serial ATA or FireWire. Computer-readable medium 910 may be any medium that participates in providing instructions to processor(s) 902 for execution, including without limitation, non-volatile storage media (e.g., optical disks, magnetic disks, flash drives, etc.), or volatile media (e.g., SDRAM, ROM, etc.).

Computer-readable medium 910 may include various instructions 914 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 904; sending output to display device 906; keeping track of files and directories on computer-readable medium 910; controlling peripheral devices (e.g., disk drives, printers, etc.) which can be controlled directly or through an I/O controller; and managing traffic on bus 912. Network communications instructions 916 may establish and maintain network connections (e.g., software for implementing communication protocols, such as TCP/IP, HTTP, Ethernet, telephony, etc.).

Delta generation module 918 may include instructions for performing the functions related to generating deltas between two documents as described above, for example one or more portions of the processes illustrated in FIGS. 5-7.

Application(s) 920 may be an application that uses or implements the processes described herein and/or other processes. The processes may also be implemented in operating system 914.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method for generating a difference between a first and second plurality of lines of text in structured machine-readable format comprising:
   determining, by at least one processor, a line of the second plurality of lines that constitutes a best match for a line of the first plurality of lines, wherein the line of the first plurality of lines and the best match are associated with a similarity score, wherein the similarity score is calculated by
      determining a first score by classifying the line of the first plurality of lines with a first classifier trained on the line of the second plurality of lines;
      determining a second score by classifying the line of the second plurality of lines with a second classifier trained on the line of the first plurality of lines; and
      combining the first score and the second score to generate the similarity score;
   comparing the similarity score to a threshold value;
   in response to determining that the similarity score is greater than or equal to the threshold value, computing, by the at least one processor, a textual difference between the line of the first plurality of lines and the best match;
   in response to computing the textual difference, identifying, based on analyzing the textual difference, a non-meaningful change; and
   in response to identifying the non-meaningful change, recording, the textual difference in a delta with a flag indicating that the non-meaningful change is present.

2. The method of claim 1 comprising repeating the determining, comparing, computing, analyzing, and recording for each line of the first plurality of lines.

3. The method of claim 1, wherein the non-meaningful change comprises at least one of a punctuation change, a phrasing change, a spacing change, a letter case change, or a year change.

4. The method of claim 3 comprising, in response to identifying a meaningful change, recording the textual difference in the delta.

5. The method of claim 1 comprising, in response to determining that the similarity score is lower than the threshold value, recording, by the at least one processor, in the delta that the line of the first plurality of lines does not appear in the second plurality of lines.

6. The method of claim 1, wherein determining, by the at least one processor, the best match comprises:
   calculating a respective similarity score between a first line of the first plurality of lines and each line of the second plurality of lines;
   determining the line of the second plurality of lines that yields a highest similarity score; and
   classifying the line of the second plurality of lines that yields the highest similarity score as the best match of the first line of the first plurality of lines.

7. The method of claim 1, wherein the delta is a JSON object.

8. The method of claim 1 comprising using the delta to update a tax content knowledge base.

9. The method of claim 1 comprising:
   determining, by at least one processor, a line of the first plurality of lines that constitutes a new best match for a line of the second plurality of lines, wherein the line of the second plurality of lines and its respective new best match are associated with a new similarity score;
   comparing, by the at least one processor, the new similarity score to the threshold value; and
   in response to determining that the new similarity score is lower than the threshold value, recording, by the at least one processor, in the delta that the line of the second plurality of lines does not appear in the first plurality of lines.

10. A system for generating a difference between a first and second plurality of lines of text in structured machine-readable format comprising:
   a first plurality of lines of text in machine readable format;
   a second plurality of lines of text in machine readable format;
   at least one processor;
   a non-transitory computer-readable medium comprising instructions stored thereon which, when executed by the at least one processor, cause the at least one processor to execute a process operable to:
      determine a line of the second plurality of lines that constitutes a best match for a line of the first plurality of lines, wherein the line of the first plurality of lines and the best match are associated with a similarity score, wherein the similarity score is calculated by
         determining a first score by classifying the line of the first plurality of lines with a first classifier trained on the line of the second plurality of lines;
         determining a second score by classifying the line of the second plurality of lines with a second classifier trained on the line of the first plurality of lines; and
         combining the first score and the second score to generate the similarity score;
      compare the similarity score to a threshold value;
      in response to determining that the similarity score is greater than or equal to the threshold value, compute a textual difference between the line of the first plurality of lines and the best match;
      in response to computing the textual difference, identify, based on analyzing the textual difference, a non-meaningful change;
      in response to identifying the non-meaningful change, record the textual difference in a delta with a flag indicating that the non-meaningful change is present.

11. The system of claim 10, wherein the non-transitory computer-readable medium comprises instructions that, when executed by the at least one processor, cause the at least one processor to repeat the determining, comparing, computing, analyzing, and recording for each line of the first plurality of lines.

12. The system of claim 10, wherein the non-meaningful change comprises at least one of a punctuation change, a phrasing change, a spacing change, a letter case change, or a year change.

13. The system of claim 12, wherein the non-transitory computer-readable medium comprises instructions that, when executed by the at least one processor, cause the at least one processor to, in response to identifying a meaningful change, record the textual difference in the delta.

14. The system of claim 10, wherein the non-transitory computer-readable medium comprises instructions that, when executed by the at least one processor, cause the at least one processor to, in response to determining that the similarity score is lower than the threshold value, record in the delta that the line of the first plurality of lines does not appear in the second plurality of lines.

15. The system of claim 10, wherein determining the best match comprises:
  calculating a respective similarity score between a first line of the first plurality of lines and each line of the second plurality of lines;
  determining the line of the second plurality of lines that yields a highest similarity score; and
  classifying the line of the second plurality of lines that yields the highest similarity score as the best match of the first line of the first plurality of lines.

16. The system of claim 10, wherein the delta is a JSON object.

17. The system of claim 10 comprising a server, wherein the server is configured to:
  receive the delta from the at least one processor; and
  update a tax content knowledge base using the delta.

18. A system for generating a difference between a first and second plurality of lines of text in structured machine-readable format comprising:
  a first plurality of lines of text in machine readable format;
  a second plurality of lines of text in machine readable format;
  at least one processor;
  a non-transitory computer-readable medium comprising instructions stored thereon which, when executed by the at least one processor, cause the at least one processor to execute a processor operable to:
    determine a line of the second plurality of lines that constitutes a best match for a line of the first plurality of lines, wherein the line of the first plurality of lines and the best match are associated with a similarity score;
    wherein the similarity score is calculated by:
      determining a first score by classifying the line of the first plurality of lines with a first classifier trained on the line of the second plurality of lines;
      determining a second score by classifying the line of the second plurality of lines with a second classifier trained on the line of the first plurality of lines; and
      combining the first score and the second score to generate the similarity score;
    compare the similarity score to a threshold value;
    in response to determining that the similarity score is greater than or equal to the threshold value, compute a textual difference between the line of the first plurality of lines and the best match;
    in response to computing the textual difference, identify, based on analyzing the textual difference, a non-meaningful change;
    in response to identifying the non-meaningful change, record the textual difference in a delta with a flag indicating that the non-meaningful change is present; and
    send the delta to a server; and
  wherein the server is configured to:
    receive the delta from the at least one processor;
    update a content knowledge base using the delta;
    receive a form from a user; and
    extract information from the received form using the delta.

* * * * *